(12) United States Patent
O'Connor et al.

(10) Patent No.: US 6,359,101 B1
(45) Date of Patent: Mar. 19, 2002

(54) PREPARING POLYETHER POLYOLS WITH DMC CATALYSTS

(75) Inventors: James M. O'Connor, Cheshire, CT (US); Donald L. Lickei, Park City, UT (US); Robin L. Grieve, North Guilford, CT (US)

(73) Assignee: SynUthane International, Inc., Newington, CT (US)

( * ) Notice: Subject to any disclaimer, the term of this patent is extended or adjusted under 35 U.S.C. 154(b) by 0 days.

(21) Appl. No.: 09/464,281

(22) Filed: Dec. 15, 1999

(51) Int. Cl.[7] .................. C08G 18/32; C08G 18/48; C08G 59/68; C08G 65/10
(52) U.S. Cl. .................. 528/66; 525/403; 528/412; 568/623
(58) Field of Search .................. 528/412, 66; 525/403; 568/623

(56) References Cited

U.S. PATENT DOCUMENTS

| 3,427,334 A | 2/1969 | Belner | |
| 3,941,849 A | 3/1976 | Herold | |
| 4,472,560 A | 9/1984 | Kuyper et al. | 526/120 |
| 4,477,589 A | 10/1984 | van der Hulst et al. | 502/169 |
| 5,096,993 A | * 3/1992 | Smith et al. | 528/66 X |
| 5,158,922 A | 10/1992 | Hinney et al. | 502/175 |
| 5,391,722 A | 2/1995 | Chandalia et al. | 536/18.6 |
| 5,470,813 A | 11/1995 | Le-Khac | 502/175 |
| 5,482,908 A | 1/1996 | Le-Khac | 502/156 |
| 5,679,764 A | 10/1997 | Pazos | 528/405 |
| 5,689,012 A | 11/1997 | Pazos et al. | 568/619 |
| 5,712,216 A | 1/1998 | Le-Khac et al. | 502/175 |
| 5,773,525 A | 6/1998 | Pazos | 525/409 |
| 5,777,177 A | 7/1998 | Pazos | 568/679 |
| 5,919,988 A | 7/1999 | Pazos et al. | 568/679 |

FOREIGN PATENT DOCUMENTS

| WO | PCT/WO99/14258 | 3/1999 | C08G/65/26 |

* cited by examiner

*Primary Examiner*—Richard D. Lovering
(74) *Attorney, Agent, or Firm*—William A. Simons; Wiggin & Dana

(57) ABSTRACT

A process for making polyether polyols employing a double metal cyanide (DMC) catalyst with specific low molecular weight polyether polyols as starters in combination with specific reaction conditions and impurity levels.

28 Claims, No Drawings

PREPARING POLYETHER POLYOLS WITH DMC CATALYSTS

BACKGROUND OF THE INVENTION

1. Field of the Invention

The invention relates to a process for preparing polyether polyols, which are useful for making polyurethane foams, elastomers, sealants, coatings, and adhesives. In particular, the invention relates to specific process improvements for preparing polyether polyols that employ a double metal cyanide (DMC) catalyst. These improvements include using the combination of specific low molecular weight polyether polyols as starters for an epoxide polymerization reaction along with specific reaction conditions and impurity levels to achieve the initiation of those low molecular weight starters.

2. Brief Description of the Art

Polyoxypropylene polyols made with double metal cyanide catalysts (DMC) were first produced by General Tire in the 1960s. In contrast to earlier polyol-making processes that were based on KOH catalysts, this technology leads to polyols with significantly reduced unsaturation and consequently essentially "true" functionality. Also, much higher molecular weight polyols may be produced. Furthermore, double metal cyanide complexes are highly active catalysts that enable the preparation of polyether polyols having narrow molecular weight distributions and very low unsaturation (i.e., low monol content) even at high molecular weights. Recent improvements have resulted in DMC catalysts that have exceptional activity. See, for example, U.S. Pat. No. 5,470,813.

Even though DMC catalysts for the production of polyols have been known since the 1960s, commercialization of polyols made from these catalysts is a recent phenomenon, and most commercial polyether polyols are still produced with potassium hydroxide catalysts. The inherent process limitation that requires the use of "higher molecular weight" starters to produce these products is one of the reasons for the delayed commercial availability of DMC polyols. Conventional polyol starters, e.g., water, propylene glycol, glycerin, trimethylolpropane, and the like, do not readily initiate DMC-catalyzed epoxide polymerizations. The starters required for DMC catalysts in these early processes must be of a moderate molecular weight (~400 Da) and also be produced beforehand with KOH catalysts. These higher molecular weight polyol starters are disadvantageous since they must be synthesized separately (e.g., from glycerin, propylene oxide, and KOH) using a dedicated reactor. In addition, the KOH catalyst must be removed from the starter polyol before it is used as an initiator for a DMC-catalyzed polyol preparation because even traces of basic substances often deactivate DMC catalysts. Typically, the polyol starter and DMC catalyst are charged to a reactor and heated with a small amount of epoxide, the catalyst becomes active, and the remaining epoxide is added continuously to the reactor to complete the polymerization.

To avoid this problem, Olin developed a patented process, (see U.S. Pat. No. 5,391,722), in which a Lewis acid catalyst was used either separately or in situ with a DMC catalyst to eliminate the need for a separate base catalyzed treated precursor. Similarly, ARCO was later issued two U.S. patents (U.S. Pat. Nos. 5,679,764 and 5,773,525) in which the solid Lewis acid catalyst MgO was used to initiate the polymerization of low molecular weight starters and then the solid catalyst was filtered off and DMC polymerization initiated. And even more recently, Bayer (see World Patent Application WO99/54383A1) described another process similar to the Olin process using perfluoroalkyl sulfonates of Group III metals with more active DMC catalysts.

A significant improvement in the DMC catalyst art was developed by ARCO with a continuous process using low molecular weight starters. This continuous process is described in ARCO patents (U.S. Pat. Nos. 5,689,012 and 5,777,177), World Patent Application WO 99/14258A1 and U.S. Pat. No. 5,919,988, which disclose that once a DMC polymerization has been initiated with higher or moderate molecular weight starters, additional PO and very low molecular weight starter such as water, propylene glycol, glycerin, trimethylol propane, and the like can be fed into the reactor along with more PO and catalyst to produce polyols in a continuous manner. In a typical batch process for making polyols using either KOH or a DMC catalyst, all of the polyol starter is charged initially to the reactor. When KOH is used as the catalyst, it is well understood by those skilled in the art that continuous addition of the starter (usually a low molecular weight polyol such as glycerin or propylene glycol) with the epoxide will produce polyols having broader molecular weight distributions compared with products made by charging all of the starter initially. This is true because the rate of alkoxylation with KOH is substantially independent of polyol molecular weight. If low molecular weight species are constantly being introduced, the molecular weight distribution will broaden.

One consequence of charging all of the starter initially as in a typical batch polyether polyol synthesis is that reactors must often be used inefficiently. For example, to make a 4000 mol. wt. polyoxypropylene diol (4K diol) from a 2000 mol. wt. polyoxypropylene diol (2K diol) "starter", the reactor will be almost half full at the start of the reaction; for example to make 50 gallons of product, we would start with 25 gallons of 2K diol starter (the build ratio for this process is 2). The "build ratio" is defined as the weight of polyol produced over the total weight of starter charged. A valuable process would overcome such "build ratio" limitations, and would permit efficient use of reactors regardless of the molecular weight of the starter or the product sought. For example, it would be valuable to have the option to charge a 50 gallon reactor with only 5 gallons of 2K diol starter, and still make 50 gallons of 4K diol product (build ratio is 10).

The ARCO continuous process allows a DMC catalyst to be used with a conventional starter such as propylene glycol or glycerin. In this process, the starter is added continuously, while conventional processes for making DMC-catalyzed polyols, all of the starter to be used is charged to the reactor at the start of the polymerization, and then oxide is fed continuously until the reaction is complete. Thus, the ARCO continuous process has several advantages. First, unlike other DMC-catalyzed polyol preparations, the process effectively uses water or a low molecular weight polyol as a starter. Previously, these starters were generally avoided because of sluggish initiation properties. Second, because water or a low molecular weight polyol can be used as a starter, the process eliminates the need to synthesize a costly higher molecular weight polyol starter by KOH catalysts in a separate, dedicated reactor. Third, the process overcomes the problem of reactor fouling by polyol gel formation that accompanies the use of DMC catalysts. Fourth, the ARCO process makes efficient use of reactors and overcomes many build-ratio limitations. Fifth, the ARCO process unexpectedly produces polyether polyols that have narrow molecular weight distributions, which are desirable for good polyurethane physical properties. Although the prior art teaches to avoid continuous addition of starters, ARCO found that continuous addition of starter, in the case of a DMC-catalyzed polyol synthesis, does not give polyols with broad molecular weight distributions.

In these ARCO continuous process patents, the continuously added starter is preferably water or a low molecular weight polyol. Low molecular weight polyols as defined in these end-uses have 1 or more hydroxyl groups and number average molecular weights less than about 300. Suitable low molecular weight polyols include, for example, glycerin, propylene glycol, dipropylene glycol, ethylene glycol, trimethylolpropane, sucrose, sorbitol, tripropylene glycol, and the like, and mixtures thereof. The starter can also be a polyol having a number average molecular weight greater than about 300 and less than the number average molecular weight of the target polyol product. ARCO also states that the initial starter may comprise the entire starter component used; thus, the process of the invention can be used to make a DMC-catalyzed polyol from just a basic starter such as propylene glycol or glycerin. However the examples in U.S. Pat. No. 5,919,988 only do this in the presence of solvent to avoid deactivating the catalyst.

Generally, the initial starter is a polyol that has a number average molecular weight less than or equal to that of the polyol product to be made. Preferred initial starters are polyether polyols having average hydroxyl functionalities from 1 to 8, number average molecular weights within the range of about 400 to about 30,000, and hydroxyl numbers within the range of about 560 to about 5 mg KOH/g. Preferably, the amount of initial starter, when used, is within the range of about 1 to about 98 eq. % of the total starter used.

Even with the advantages noted above with the ARCO continuous process further improvements are warranted. Particularly needed is a process that eliminates the need to separately synthesize a polyol starter by KOH catalysts or the requirement of using a solvent when low molecular weight starters are used and lastly a process that can effectively utilize low molecular weight starters in a batch as well as a continuous operation.

BRIEF SUMMARY OF THE INVENTION

Accordingly, one aspect of the present invention is directed to a process for making a polyether polyol, said process comprising
(a) polymerizing an epoxide in the presence of a double metal cyanide (DMC) catalyst and a continuously added first starter wherein the epoxide and first starter are continuously added to the reactor during step (a) to produce a polyol intermediate; and
(b) reacting the polyol intermediate with additional epoxide and, optionally, additional DMC catalyst and a second starter to produce a polyether polyol; wherein said first starter is selected from the group consisting of:
(i) at least one compound having the formula (I):

$$HO—H_2C—[CH_2]_n—OH \qquad (I)$$

wherein n is an integer from 5 to 20;
(ii) cyclohexane dimethanol;
(iii) at least one compound having the formula (II):

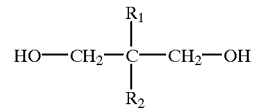

(II)

wherein $R_1$ and $R_2$ are individually selected from an alkyl group having 1 to 6 carbon atoms;
(iv) at least one compound having the formulae (III) or (IIIA):

$$HO—CR_3R_4—[CH_2]_n—CR_5R_6—OH \qquad (III)$$

$$HO—CH_2—CR_3R_4—[CH_2]_n—CR_5R_6—CH_2—OH \qquad (IIIA)$$

wherein $R_3$ and $R_5$ are individually selected from hydrogen and an alkyl group having 1 to 6 carbon atoms $R_4$ and $R_6$ are individually selected from an alkyl group have 1 to 6 carbon atoms; and n is an integer from 1 to 20;
(v) bishydroxyethyl hydroquinone or bishydroxypropyl hydroquinone;
(vi) bishydroxyethyl resorcinol or bishydroxypropyl resorcinol;
(vii) α, α, α', α'-tetramethyl-1,3-benzene dimethanol or α, α, α', α',-tetramethyl-1,4-benzene dimethanol; and
(viii) mixtures of compounds of groups (i) to (vii) or their ester or ether derivatives.

Another aspect of the present invention is directed to a process for making a polyether polyol, said process comprising:
(a) polymerizing an epoxide in the presence of a double metal cyanide catalyst and a continuously added first starter wherein the epoxide and first starter are continuously added to the reactor during step (a) to produce a polyol intermediate; and
(b) reacting the polyol intermediate with additional epoxide and, optionally, additional DMC catalyst and a second starter to produce a polyether polyol; wherein step (a) is conducted with a mole ratio of total epoxide added to total first starter added of at least about 3:1; and wherein the first starter added in step (a) has an impurity level of total amount of water, propylene glycol and neutralized base residues of less than about 1000 parts per million by weight.

And another aspect of the present invention is directed to a two-stage batch process for making a polyether polyol in a reactor, said process comprising:
(a) polymerizing an epoxide in the presence of a double metal cyanide catalyst and a starter to produce a polyol intermediate; and
(b) adding additional epoxide and reacting the polyol intermediate with the additional epoxide in the reactor to produce a polyether polyol; wherein said starter is selected from the group consisting of:
(i) at least one compound having the formula (I):

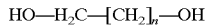  (I)

wherein n is an integer from 5 to 20;
(ii) cyclohexane dimethanol;
(iii) at least one compound having the formula (II):

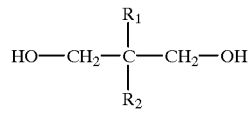  (II)

wherein $R_1$ and $R_2$ are individually selected from the group consisting of an alkyl group having 1 to 6 carbon atoms;
(iv) at least one compound having the formulae (III) or (IIIA):

  (III)

  (IIIA)

wherein $R_3$ and $R_5$ are individually selected from hydrogen and an alkyl group having 1 to 6 carbon atoms, $R_4$ and $R_6$ are individually selected from the group consisting of an alkyl group having 1 to 6 carbon atoms and n is an integer from 1 to 20;
(v) bishydroxyethyl hydroquinone or bishydroxypropyl hydroquinone;
(vi) bishydroxyethyl resorcinol or bishydroxypropyl resorcinol;
(vii) α, α, α', α'-tetramethyl-1,3-benzene dimethanol or α, α, α', α'-tetramethyl-1,4-benzene dimethanol;
(viii) dipropylene glycol or tripropylene glycol, wherein the impurity level of total amounts of water, propylene glycol and neutralized base residues is less than 1000 parts per million by weight and the mole ratio of total epoxide added to total starter added is at least about 3:1; and
(ix) mixtures of compounds of groups (i) to (viii) or their ester or ether derivatives.

The process invention is also directed to polyether polyols and polyurethanes made by these processes.

We have surprisingly found that low molecular weight starters of groups (i) to (viii) can be directly initiated with DMC catalysts if the alcohol moieties are far enough apart or surrounded by other bulky groups so that the simultaneous interaction of both (all) hydroxyl groups with the catalyst is precluded. Additionally, if the structure of the starter is less favorable, either because the alcohol moieties are too close together or because other functional groups such as the ether moiety cause the starter to be strongly absorbed onto the catalyst thus delaying or precluding initiation, modifications of the reaction conditions can force the initiation to occur especially by increasing the ratio of the number of moles of PO to moles of starter. In all situations, it is also very desirable but not critical to minimize the amount of water, neutralized basic residues and other "low" molecular weight functional materials (i.e. propylene glycol in di- or tripropylene glycol) in the starter to facilitate initiation. This is accomplished by thoroughly stripping the starter, or by phosphoric acid neutralization before reaction.

DETAILED DESCRIPTION OF THE INVENTION

The catalyst for these process improvements is a double metal cyanide (DMC) catalyst. Any DMC catalyst known in the art is suitable for use in the process. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,472,560, 4,477,589, 3,427,334, 3,941,849, 5,470,813, 5,712,216, and 5,482,908, the teachings of which are incorporated herein by reference. Particularly preferred DMC catalysts are zinc hexacyanocobaltates.

A summary of all the relevant data generated is included in Tables 1–6. Table 1 contains the preliminary work carried out in a 2 liter Parr reactor. These experiments were based on a constant weight of both catalyst and starter. This led to final catalyst concentrations generally from ~20–70 ppm catalyst in a polyol of 2000 equivalent weight. The reactor was heated to 125° C., PO added to ~30 psi pressure and after initiation occurred, the PO addition was maintained to keep the temperature and pressure at approximately the starting conditions. It should be noted that typically DMC initiated polymerizations of propylene oxide (PO) have an inhibition period before the catalyst starts the polymerization. This time can be minutes or hours depending on the catalyst. The initiation of ARCOL 425 (400 molecular weight polypropylene oxide derived starter) required over 3 hours to initiate under these conditions. Additionally, all of the data in Table 1 is based on samples as received under the same set of reaction conditions. It will be clear with the later discussion that a lot more can be done with these materials to improve the performance.

The data in Table 2–6 are based on the procedure of adding starter, PO and catalyst initially; 50 ppm or less catalyst charge (final level in a 2000 equivalent weight polyol) unless otherwise specified with both the starter and PO initial levels varying as described in the table. The reactor was rapidly heated to 140° C. unless noted otherwise, and the initiation time is defined as the time from 100° C. to polymerization initiation. Since we were exploring conditions to speed initiation, generally no additional PO was added to the reactor once the initial charge was consumed.

All of the data in Tables 1–5 are based on a DMC catalyst prepared via the procedure outlined in U.S. Pat. No. 5,712, 216, (1998) to ARCO (example #8) (a simplified process to facilitate laboratory preparation). It is believed that even with some compositional differences and reduced activity, this catalyst represents a "standard" DMC catalyst. It is also believed that this reduced reactivity would help differentiate the different starters. This fact is dramatically confirmed when different catalysts were used as is described in Table 6. The factors affecting starter initiation of propylene oxide (PO) are listed below:

1. Structure of starter (molecular weight and stereochemistry)

2. Impurities in starter including water
3. Ratio of the number of moles of PO to moles of starter
4. Catalyst level
5. Catalyst type

1. Structure of Starter

The structure of the starter is one of the major determiners in whether a DMC catalyst will initiate polymerization or not. The typical starters for propylene oxide-derived polyols are propylene glycol and glycerin but these are essentially inactive when mixed with PO and DMC catalyst and processed in the normal way. Apparently the small molecule with 2 or 3 —OH groups in close proximity, sits down tightly on the catalyst surface and does not allow the PO to approach and add easily. This effect is enhanced when the molecule has ether groups between the —OH groups i.e. dipropylene glycol. It is only when a larger number of propylene oxide units are strung together that these ether-alcohols allow for the relatively facile initiation of a DMC polymerization—i.e. a polypropylene glycol with a molecular weight of 400–600. Most of the following discussion revolves around diols since a significant number of variants exist. The conclusions reached here are generally applicable to triols.

It has been unexpectedly found that if one separates the —OH groups far enough in one molecule and/or eliminates backbone ether functionality, lower molecular weight starters will easily initiate a DMC polymerization. The series of linear alcohols (see FIG. 1) from $C_2$ to $C_{20}$ were run under similar conditions. (All these diols have terminal rather than internal —OH groups-thus 1,2; 1,3; 1,4; 1,5; 1,6; and the like.)

Figure 1

n=1,2,3,4,5,6, etc.

In contrast, under very mild conditions and low ratios of propylene oxide to diol, the $C_2$ to $C_4$ did not initiate in 5–8 hours (see Table 1 below). However, the $C_8$, $C_{10}$, $C_{12}$ initiated in less than 1 hour and rapidly added PO (see Table 1 below). Apparently, the —OH groups in the shorter chain diols, still sit on the catalyst too tightly, thus preventing the PO from adding. With the longer chains the probability of both ends sitting on the same part of the catalyst and preventing the PO from adding is much less. It is not molecular weight that controls this effect since 1,2-dodecanediol does not initiate PO polymerization the way the 1,12 isomer does under the same conditions. Cyclohexane dimethanol, (CHDM) with its bulky structure and separated —OH groups also readily adds PO. CHDM is usually a mixed isomer with a cis/trans ratio of 70/30.

Figure 2

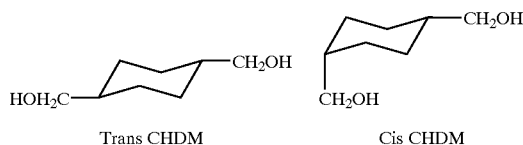

Trans CHDM          Cis CHDM

Similarly bisphenol A or its 2 mole propoxylate initiate PO polymerization with DMC in less than 4 hours.

If the distance between the —OH groups was the only contributing factor, then possibly dipropylene glycol and certainly tripropylene glycol should rapidly initiate PO polymerization under the same conditions as described above. This is not the case and this fact lends support to the idea that the ether groups also coordinate with the catalyst and prevent the easy entry of propylene oxide.

Multiple —OH groups seem to be necessary to form this strong complex with the catalyst. Both normal and tertiary butanol rapidly initiate PO polymerization (less than 1 hour). Even the monobutyl ether of tripropylene glycol rapidly initiates PO polymerization. Apparently two —OH groups complexing with the catalyst have a more significant effect than 1 —OH and the ether moiety. (see Table 1)

In addition to distancing the —OH groups, steric factors also play a very significant role. Note the series of 1,3 diols (See FIG. 3) starting with 1,3-propane diol (not run), to 2-methyl-1,3-propanediol (MPDiol), neopentyl glycol (2,2-dimethyl-1,3-propanediol or NPG) and lastly 2-ethyl-2-butyl-1,3-propanediol.

Figure 3

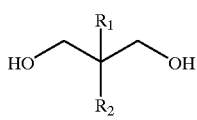

1,3-diols; $R_1$=H, $CH_3$, $C_2H_5$
$R_2$=H, $CH_3$, $C_4H_9$

The $1^{st}$ two alcohols of this series don't add PO under a variety of conditions (see Table 2). The neopentyl glycol initiates with extreme difficulty (see discussion later with higher ratio of PO to starter) but the 2-ethyl-2-butyl-1,3-propanediol initiates only 30 minutes after coming to temperature with the PO.

Similar effects were seen with the unsubstituted and substituted 1,4-butanediol and 1,5-pentanediol. (see FIGS. 4 and 4a)

Figure 4

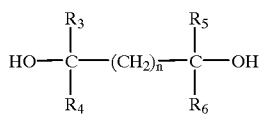

n=1,2,3 . . .

$R_3, R_4, R_5, R_6 = H, C_1$ to $C_4$ alkyl

Figure 4A

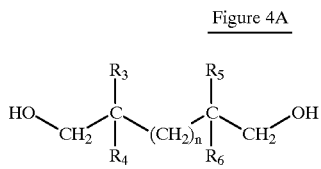

n=1,2,3 ...
$R_3, R_5 = H, C_1$ to $C_4$ alkyl
$R_4, R_6 = C_1$ to $C_4$ alkyl

The unsubstituted 1,4-butanediol did not initiate in ~7 hour, but the 1,1,4,4-tetramethyl-1,4-butanediol initiated after 45 minutes. The unsubstituted 1,5-pentanediol initiates with difficulty at very high PO to starter ratios, but the hindered diol, 2,4-diethyl-1,5-pentanediol initiates in less than 30 minutes. (see Table 2)

Based on the steric factors discussed above, one might expect trimethylol propane to initiate at a rate similar to neopentyl glycol. (FIG. 5)

Figure 5

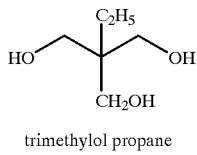

trimethylol propane

However this was not the case and no initiation occurred after 7 hours even with a high PO to starter ratio and added phosphoric acid (see Table 3). Apparently the $3^{rd}$ —OH group also interacts with the catalyst preventing PO addition.

Strangely, some of the diols that have widely separated —OH groups and no complexing ether groups in the backbone still didn't initiate polymerization readily. For example, the α,α,α',α'-tetramethyl-1,3-benzene dimethanol, the α,α,α',α'-tetramethyl-1,4-benzene dimethanol (FIG. 6), failed to initiate PO polymerization. (Table 1)

Figure 6

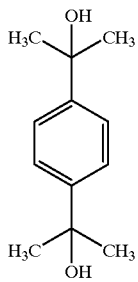

α,α,α',α'-tetramethyl-1,4-benzenedimethanol

Neither the bishydroxyethyl hydroquinone (HQEE) nor the bishydroxypropyl resorcinol (HPR) (FIG. 7) initiated under these conditions. (Table 1)

Figure 7

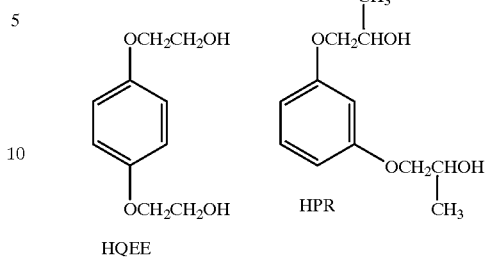

HQEE    HPR

Lastly the pure trans cyclohexane dimethanol initiated slower than the mixed isomer even when one would expect that the widely separated —OH groups in the trans isomer would be less likely to complex than the —OH groups in the cis isomer. This fact suggests that other factors such as impurities (and in the above cases it's probably base) have an influence on starter activation. This fact was verified, when the HPR was neutralized with 1400 ppm $H_3PO_4$ and run at a higher PO to starter ratio (see next section for further discussion). The reaction initiated after 2.5 hour (see Table 4, run 16). It is apparent, that all of these seemingly inactive diols with widely separated hydroxyl groups will add propylene oxide under the proper conditions.

When compounds (i) to (viii) are used as first starters in a continuous process, a portion of them (i.e. usually less than 20% by weight of the total weight added) may be initially added with the DMC catalyst before continuously adding the epoxide and the remainder of the first starter. Additionally, after the polyol intermediate is formed, the compounds (i) to (viii) or conventional starter material may be added as second starters in order to form the desired polyether polyol.

This list of diols is by no means meant to be exhaustive and other diols with similar structural effects and distance between the reactive hydroxyl groups could also be used as novel starters for DMC polymerizations.

2. Impurities in the Starter and Moles PO/Moles Starter in the Initiator Feed (See Tables 2–5)

Impurities, particularly those which are basic in nature, have been shown to have a detrimental effect on DMC catalyzed polymerizations. In one of the latest ARCO patents for the continuous process (WO99/14258) glycerin must be neutralized with 20 ppm of acid ($H_3PO_4$) to prevent the deactivation of the DMC catalyst. When tripropylene glycol (TPG) is used as a starter no initiation occurs under conditions which will initiate most of the novel starters of the present invention (see groups (i) to (viii) above). (see Table 1). When tripropylene glycol (TPG) is treated with magnesol and neutralized with 300 ppm of phosphoric acid according to the present invention, the rate of PO initiation increases substantially. (Initiation occurred in less than 6 hours for the magnesol treatment and under 3 hours for the magnesol/$H_3PO_4$ treatment—see Table 3, runs 2 & 3.) (Similarly with $H_2SO_4$—runs 2 & 4)

More significantly, it has also been found that higher PO/starter mole ratios have a significant effect on time to initiate however, the potential danger here is that once initiation occurs, the reaction proceeds rapidly and the exotherm must be controlled to avoid over pressurization. When the PO/TPG ratio was increased from ~3 to 5, (see Table 3, runs 1 & 2), initiation occurred in less than 3 hours. When the ratio was increased from 5 to almost 8 (run 5), the initiation time didn't change but the reaction exothermed to 200° C. The distilled TPG or the distillation residue neutralized with 300 ppm $H_3PO_4$ (run 6 or 7) did not initiate any faster than the magnesol/$H_3PO_4$ treated TPG (run 3). However the distillation residue with no $H_3PO_4$ treatment initiated faster than the treated $H_3PO_4$ system. (see run 8) The higher PO/TPG ratios had little effect on the time to initiation unless the TPG was crudely distilled with no phosphoric acid treatment, and then vacuum stripped in the reactor. In that case, the initiation time was reduced to just over 1 hour (see Table 3 run 9), suggesting that possibly low molecular weight impurities such as dipropylene glycol (DPG) and PG and possibly water in the TPG could be hindering initiation. A more substantial exotherm was also generated for this run. We expect that by lowering the PO/starter ratio with this "purified" TPG, a more controllable exotherm would result. This effect was observed with the DPG runs included in Table 3—run 12 & 13).

These data for TPG suggest that with "purification", DPG may also initiate but at a rate that is less than "pure" TPG. This supposition was also substantiated. The DPG distillation residue was stripped for 2 hour at 70° C. under vacuum and PO charged at a PO/DPG ratio of 3.7. Although the reaction was sluggish, all of the PO was consumed in just under 7 hours (run 10). When distilled and vacuum stripped DPG was run at a PO/DPG ratio of 7 with PO dried over molecular sieves, the reaction initiated in less than 3 hours and was completed in another 11 minutes (run 12). The exotherm peaked at 257° C. so better cooling or a lower PO/starter ratio is required to capitalize on this development. At a PO/DPG ratio of 5.82 with all other conditions the same, the reaction exothermed in just over 3 hours (the exotherm only reached 155° C.) and the reaction was complete in another 15 minutes. (see Table 3, run 13)

Triols and particularly TMP are much more difficult to initiate. (Table 3, runs 14–16) Higher PO/starter levels and phosphoric acid additions failed to allow initiation to occur in a reasonable time with (50 ppm) catalyst levels. Attempts to strip the TMP alone or stripping the TMP after phosphoric acid neutralization were unsuccessful in initiating this starter. Besides TMP, only glycerin and some other hexanetriol isomers are readily available starters for triol production. Other catalysts or higher levels seem to be required to achieve easy PO addition to low molecular weight triol starters.

Similarly, neopentyl glycol initiated in ~6 hours when the PO to starter ratio was increased from around 3 to 5 (at 3 it did not initiate) (see Table 4, runs 1 & 2). The addition of 800 ppm of $H_3PO_4$ only slightly lowered the initiation time for NPG (run 3). 1,4-butane diol didn't initiate at a PO to starter ratio of over 4 (run 4) but 1,5-pentanediol initiated at a PO/starter ratio of over 8 (run 5). The 1,6-hexanediol which was inactive at a PO/starter ratio of 1.4, initiated in 90 minutes with a ratio of 3.7 (see Table 4, runs 6 & 7). This series again demonstrates the fact that the longer chain diols are easier to initiate than shorter chain length diols. Cyclohexanedimethanol showed little change in the initiation time with a ratio increase from 2.5–3.0 (~5 minutes runs 11 & 13), but the initiation time decreased by 20 minutes with the addition of phosphoric acid (run 12). Similarly as discussed above, HPR did not initiate until the apparent base residues in the starter were neutralized with phosphoric acid and a high PO to starter ratio was used (see Table 4, run 16). The acid neutralization does not speed the initiation of all potential starters, but for those that have base residues present, acid neutralization is essential. Increasing the ratio of PO to starter seems to benefit all.

With 2-butyl-2-ethyl-1,3-propanediol, it was found that by increasing the PO to starter ratio from 2.7 to 4.4, the initiation time dropped from over an hour to 25 minutes with no observable exotherm (see Table 5, runs 1 & 3). Phosphoric acid addition did not have any effect (run 2). Since this polyol and the 2,4-diethyl-1,5-pentanediol are produced by some type of base catalyzed condensation reaction involving formaldehyde or other aldehydes as starting materials, we spiked the 2-ethyl-2-butyl-1,3-propanediol obtained from Kyowa Hakko with about 300 ppm of heptanal. This increased the initiation time from 25 to 40 minutes (run 4). With 900 ppm, no further reduction in initiation time was observed. It was also found that by adding 800 ppm of $H_2O$ to 2-ethyl-2-butyl-1,3-propanediol the initiation time increased to over 90 minutes (run 5). Another run with 2500 ppm $H_2O$ tripled the initiation time to over 3 hours (run 6). Similarly, higher PO/starter ratios reduced the initiation time for 2,4-diethyl-1,5-pentanediol (see Table 5, runs 7 & 8). Phosphoric acid neutralization had no effect on the initiation time (run 9). Distillation of the 2,4-diethyl-1,5-pentanediol reduced the initiation time (run 10) and even the distillation residue initiated at a faster rate than the undistilled starting material (run 11). Magnesol treatment actually increased the initiation time (run 12) but after distillation the rate of initiation approached the distilled starter from run 11.

3. Catalyst Level/Catalyst Type

Some of the early General Tire work reports the production of polyols based on either trimethylol propane or ethylene glycol. Very high catalyst levels (~450–1500 ppm) were used with all the PO, initiator and catalyst charged at the start and with the components allowed to react over 24 hour. Even for the glyme based catalysts, this is a very high level since the "normal" levels are 200–250 ppm. The high catalyst levels make this approach impractical in a commercial sense.

All of the work described so far is based on DMC catalyst prepared via the procedure outlined in U.S. Pat. No. 5,712,216, that issued to ARCO (example #8) (a simplified process to facilitate laboratory preparation). It is believed that even with some compositional differences and reduced activity, this catalyst represents a "standard" DMC catalyst. To compare activity, we produced a more active ARCO catalyst (U.S. Pat. No. 5,470,813). Some additional work with some of the catalysts described in the literature indicate that some further improvements are possible (see Table 6). A catalyst described in U.S. Pat. No. 4,477,589 (Shell) was utilized which is based on glyme modification; a t-butyl alcohol modified version following this same procedure and a third catalyst based on the original General Tire Pat. No. 3,427, 334 also modified by t-butyl alcohol was produced. The results using these catalysts are included in Table 6.

It is clear that the catalyst based on U.S. Pat. No. 4,477,589 and its t-butanol modified analogue and the t-butanol modified General Tire catalyst, at the same use level, initiate the polymerization of PO much more rapidly than the catalyst from U.S. Pat. No. 5,712,216 and even more rapidly than the more active ARCO catalyst from U.S. Pat. No. 5,470,813. However these catalysts seem to be more susceptible to impurities or to temperature. In some instances the reaction stopped before all the PO was consumed. Butanol, dipropylene glycol, cyclohexanedimethanol and 2-butyl-2-ethyl-1,3-propanediol all initiated in minutes and at some of the same PO to starter ratios used with the catalyst from U.S. Pat. No. 5,712,216, the reaction uncontrollably exothermed. This exotherm can be controlled by lowering this PO to starter ratio as evidenced by CHDM and DPG examples in Table 6. Obviously reducing the catalyst to a level below the 50 ppm used in this work would also achieve the same result. Table 6 also includes data with trimethylol propane (TMP). At the standard 50 ppm catalyst charge, even at an extremely high PO to starter ratio (32), initiation did not occur after 4 hours. However with a higher catalyst level (>100 ppm) and high PO to starter ratios (>16), initiation occurred in about 15 minutes with a controllable exotherm but in several cases PO uptake stopped indicating a potential catalyst deactivation.

One other experiment with TMP was carried out in which a very high level of PO to starter (92) was used. In order to control the exotherm only a very small amount of starter was charged to the reactor. The reaction initiated in about 15 minutes and the $1^{st}$ charge of PO was consumed in 35 minutes total. Additional PO was added and the reaction carried out to completion over another 2 hours. A polyol with nearly an 8000 molecular weight resulted. The build ratio was just under 60.

An additional set of high PO/starter experiments were run with CHDM. At a PO/starter ratio of 35, the CHDM achieved activation within minutes with the Shell and General Tire catalysts with a very high exotherm. However, these polymerizations ceased before all the PO was consumed. With the control catalyst, it took an hour to activate the catalyst, but once activated all the PO was consumed in about 5 minutes (the exotherm brought the temperature to 210°C.—see Table 6). The catalyst was still active and additional PO was added to bring the molecular weight to 6000. The polyol preparation took place in one reactor over about 2.5 hour with no separate starter preparation required. The build ratio was over 40.

Contrary to the current literature, this work has demonstrated that low molecular weight diol starters can be used to produce polyols from DMC catalysts. Both DPG and TPG when purified and subjected to the process technology of this invention are suitable starters for DMC polymerizations. The other hindered diols or diols with greatly separated hydroxyl functionality are extremely active starters for DMC polymerizations. Low molecular weight triols such as glycerin or trimethylol propane do not readily initiate DMC polymerizations unless very high catalyst levels are utilized.

How can these discoveries be translated to a commercial process. Since none of these "low" molecular weight diols have been used as starters for propylene oxide based polyols using DMC catalysts, as the first part of this invention, these polyols are new compositions of matter and the processes to produce these polyols are also new. These polyols can range in molecular weight from 300 to 30,000, contain random ethylene oxide up to 30% by weight or have up to 40% ethylene oxide at the end of the chain to improve reactivity. Also the broad number of products (elastomers, sealants, adhesives and coatings) derived from these polyols are also new compositions. Secondly, the processes to produce polyols from di- and tri-propylene glycol directly from DMC catalysts have not been described in the literature; these processes are also novel.

The conventional batch technology to produce polyols usually is based on the synthesis of an intermediate molecular weight (400–600 Da) precursor. This starter is stored until needed at which time more KOH is added, the product stripped and PO addition started. Even with the new ARCO continuous technology, utilization of a standard base initiated starter is preferred. Since residual base has such a detrimental effect on DMC catalysts, the starter must be treated to remove residual alkalinity, thus adding another step.

Additionally, this invention is an improvement over the patented ARCO continuous process technology. Using one of the more active diols such as cyclohexanedimethanol or 2-ethyl-2-butyl-1,3-propanediol the catalyst can be activated and then additional DMC catalyst, propylene oxide, water or propylene glycol could be fed into the reactor continuously while product is continuously removed. This would eliminate the need for using the high molecular weight starter or the need to use solvents with the low molecular weight starters to get the process going. With a large volume continuous process the small amount of material initiated with the novel starters of this invention would be difficult to detect analytically. If dipropylene glycol or tripropylene glycol were used with some of the other process modifications of the present invention to start the process in the same manner as described above for the novel diols, there would be no difference between this product and one produced by the methods of the ARCO process. With the more active diols such as 2-ethyl-2-butyl-1,3-propanediol and cyclohexanedimethanol and the linear diols, a 1 reactor CSTR (Continuous Stirred Tank Reactor) process is possible. Initiate, then feed PO, catalyst and starter while simultaneously removing product.

For capping, a $2^{nd}$ reactor would be required receiving the output from the $1^{st}$ and then adding EO. This $2^{nd}$ reactor would be catalyzed by KOH and if KOH is used, then a treatment step will be needed to remove catalyst.

Another aspect of this invention is a single reactor batch process to produce polyols (see Examples 7 and 8). Catalyst, PO and starter are charged to a reactor. High PO/starter ratios are used but the ratio can be adjusted to achieve a timely initiation while still maintaining control over the exotherm. After initiation, PO is fed at a rate that is only limited by the heat exchange capabilities of the reactor until the desired degree of polymerization is achieved. Based on the examples in the ARCO patent, (U.S. Pat. No. 5,777,177) and our work with TMP, even the DPG or TPG could be utilized in this one reactor batch process if the PO to starter ratio is high enough so that only enough initiator is placed in the reactor to generate the final polyol in sufficient quantity to fill the production reactor. For example, DPG, catalyst and PO are added to the reactor with a catalyst level of ~50 ppm or less, the ratio of PO to starter is very high but the total amount of starter is low enough so that the exotherm is easily controlled and once the reaction initiates, PO is fed in at a rate that the heat exchange capacity can control the exotherm until the desired molecular weight is achieved. As is evident from the examples, many different DMC catalysts can be used for this process. The main consideration is to adjust the ratio of PO to starter, the catalyst level and the amount of starter initially charged to achieve full utilization of the production reactor. The build ratio for such a process would be much higher than conventional processes and approach the build ratio for the continuous processes described in U.S. Pat. No. 5,777,177. Preferably, the build ratios for this batch process of the present invention are greater than about 20.

As another aspect of this invention, a more conventional DMC based batch process utilizing dipropylene glycol or some of the other active diols can be envisioned in the following way. This specific process is not constrained by any of the catalyst technology currently in the patented or expired art. Any and all of this art can be utilized in the practice of this invention. A 2-reactor setup could be utilized in which the $1^{st}$ or precursor reactor with very efficient cooling produces the intermediate molecular weight product. All the catalyst could be added to this $1^{st}$ reactor if desired and after pumping the precursor into the main reactor, PO addition begins and continues until the desired molecular weight is achieved. Since it would be desirable not to remove catalyst from the finished polyol, it may be prudent to add additional catalyst in this $2^{nd}$ reactor when the higher molecular weight products are produced. With a two reactor process such as this, the importance of an extremely rapid PO initiation becomes somewhat less important since the time in the $2^{nd}$ reactor will be at least as long as the time in the $1^{st}$ precursor reactor. Obviously a major consideration is the cost of the starter. DPG or TPG are marginally more expensive than PG but could be considered good candidates as a starter. A longer initiation time may lend itself to a 2 reactor process so that initiation could occur outside the main reactor, thus maximizing the overall productivity of the process.

As a last variation, the batch process of Pressindustria S.P.A. (licensed to Scientific Design Company, Inc.) for the production of polyols could be advantageously utilized with DMC catalytic processes employing the novel starters of the present invention. The heat exchange loop which continuously recycles the growing volume of liquid phase is ideal to control the large exotherm generated with the high PO starter ratios in conjunction with the more active DMC catalysts.

The present invention is further described in detail by means of the following Examples and Comparisons. All parts and percentages are by weight and all temperatures are degrees Celsius unless explicitly stated otherwise.

EXAMPLE 1

Preliminary Screening Experiments

Table 1 contains the preliminary work carried out in a 2 liter Parr Reactor. These experiments were based on adjusting the reactor charge to achieve a constant weight of both catalyst and starter. This led to final catalyst concentrations from ~20–70 ppm for a polyol of 2000 equivalent weight. This work is based on DMC catalyst prepared via the procedure outlined in U.S. Pat. No. 5,712,216, to ARCO (Example #8) (a simplified process to facilitate laboratory preparation). After flushing several times with nitrogen, the reactor was heated to 125° C., PO added to ~30 psi pressure and after initiation occurred, the PO addition was maintained to keep the temperature and pressure at approximately the starting conditions. It should be noted that typically DMC initiated polymerizations of propylene oxide (PO) have an inhibition period before the catalyst starts the polymerization. This time can be minutes or hours depending on the starter or the specific catalyst. The initiation of PPG 400 (400 molecular weight polypropylene oxide derived starter) required over 3 hours to initiate under these conditions. Additionally, all of the data in Table I is based on samples as received.

TABLE 1

Preliminary Screening Experiments

| STARTER | DMC LEVEL | TIME TO INITIATION | OH # (Calc) | OH # (Found) |
|---|---|---|---|---|
| methanol | 50 ppm | 3 hr (did not initiate) | | |
| n-butanol | 50 ppm | 28 mins | | |
| t-butanol | 50 ppm | 36 mins | | |
| tripropylene glycol butyl ether | 20 ppm | 45 mins | | |
| 1,12-dodecanediol | 76 ppm | 25 mins | 136 | 136 |
| 1,10-decanediol | 65 ppm | 27 mins | 153 | 152 |
| 1,2-decanediol | 50 ppm | >6 hr (did not initiate) | | |
| 1,8-octanediol | 54 ppm | 46 mins | 194 | 193 |
| 1,6-hexanediol | 44 ppm | >5 hr (did not initiate) | | |
| 1,4-butanediol | 50 ppm | >7 hr (did not initiate) | | |
| ethylene glycol | 23 ppm | >7 hr (did not initiate.) | | |
| tripropylene glycol | 72 ppm | >6 hr (did not initiate) | | |
| CHDM | 54 ppm | 4 hr 15 mins | 296 | 295 |
| bisphenol A propoxylate | 129 ppm | 1 hr 16 mins | 130 | 131 |
| bisphenol A | 86 ppm | 3 hr 40 mins | 195 | 197 |
| ARCOL 425 | 40 ppm | 3 hr 20 mins | | |
| dodecanedioic acid | 84 ppm | >5 hr (did not initiate) | | |
| MPDiol | 34 ppm | >4 hr (did not initiate) | | |
| tetraCH3-1,4-benzenedimethanol | 50 ppm | >7 hr (did not initiate) | | |
| HQEE | 50 ppm | >3 hr (did not initiate) | | |
| HPR | 50 ppm | >7 hr (did not initiate) | | |

EXAMPLE 2

Steric Effects of the Starter on DMC Catalyst Initiation

The polymerizations in Table 2 were carried out in a 300 ml Parr reactor. The procedure used is as follows: add starter, PO and catalyst initially; (50 ppm or less catalyst charge assuming a 2000 equivalent weight polyol) with both the starter and PO initial levels varying as described in the table.

The reactor was pressured up to 80 psi with nitrogen, stirred for several minutes and then bled off to 2 psi. In those cases where the starter was vacuum stripped, the catalyst and starter were charged to the reactor, the reactor was heated to 70–80° C. under vacuum (~1 mm) for 2–3 hours with stirring. The reactor was cooled to room temperature and then the propylene oxide added. The 300 ml Parr Reactor was rapidly heated to 140° C. unless noted otherwise, and the initiation time is defined as the time from the reactor reaching 100° C. to polymerization initiation. Since we were exploring conditions to speed initiation, generally no additional PO was added to the reactor once the initial charge was consumed. Several runs where additional PO were added to test the efficacy of the product were carried out and these data points are noted. The starters studied in Table 2 are some of the non-conventional alcohols.

TABLE 2

Steric Effects of the Starter on DMC Initiation of PO

| STARTER | MOLS PO/MOLS STARTER | TIME TO INITIAL EXOTHERM | TIME TO PEAK EXOTHERM | TIME TO PO COMPLETION | COMMENTS |
|---|---|---|---|---|---|
| MPDiol | 4.12 | | | | did not initiate in 7 hr 800 ppm $H_3PO_4$ |
| MPDiol | 4.65 | | | | did not initiate in 7 hr |
| neopentyl glycol | 2.87 | | | | Did not initiate in >5 hrs |
| neopentyl glycol | 4.77 | 6 hrs 10 mins | | 7 hrs | |
| neopentyl glycol | 4.77 | 5 hrs 59 mins | 6 hrs 47 mins | | 800 ppm $H_3PO_4$ |
| 2-butyl-2-ethyl-1,3-propanediol | 2.76 | 1 hr 9 mins | 1 hr 55 mins | | Kyowa Hakko |
| 2-butyl-2-ethyl-1,3-propanediol | 4.41 | 25 mins | 55 mins | | Kyowa Hakko ($H_3PO_4$) |
| 2-butyl-2-ethyl-1,3-propane | 4.41 | 23 mins | 47 mins | | Kyowa Hakko |

TABLE 2-continued

Steric Effects of the Starter on DMC Initiation of PO

| STARTER | MOLS PO/MOLS STARTER | TIME TO INITIAL EXOTHERM | TIME TO PEAK EXOTHERM | TIME TO PO COMPLETION | COMMENTS |
|---|---|---|---|---|---|
| diol | | | | | |
| 1,4-butanediol | 4.12 | | | | Did not initiate in ~7 hr |
| 1,1,4,4-tetramethyl-1,4-butanediol-1,4-butanediol | 4.0 | 45 mins | 95 mins (150° C.) | 1 hr 25 mins | |
| 1,5-pentanediol | 8.3 | 4 hrs | 4 hrs 2 min (280° C.) | 4 hrs 15 min | |
| 2,4-diethyl-1,5-pentanediol | 2.76 | 55 mins | | 1 hr 19 mins | |
| 2,4-diethyl-1,5-pentanediol | 4.41 | 31 mins | 34 mins (290° C.) | 36 mins | |
| 2,4-diethyl-1,5-pentanediol | 4.41 | 32 mins | 33 mins | 37 mins | 800 ppm $H_3PO_4$ |
| 2,4-diethyl-1,5-pentanediol | 4.41 | 23 mins | 25 mins | 29 mins | distilled |

EXAMPLE 3

Conventional Polyol Initiators

An identical procedure to Example 2 was followed for these experiments. The starters used here are the more conventional starters such as DPG, TPG and TMP. The results are included in Table 3.

TABLE 3

Conventional Polyol Initiators

| | STARTER | MOLS PO/MOLS STARTER | TIME TO INITIAL EXOTHERM | TIME TO PEAK EXOTHERM[1] | TIME TO PO COMPLETION | COMMENTS |
|---|---|---|---|---|---|---|
| 1 | tripropylene glycol | 3.31 | 7 hrs 7 mins | | 7 hrs 37 mins | Magnesol[2] treated |
| 2 | tripropylene glycol | 5.3 | 5 hrs 43 mins | | 6 hrs 23 mins | Magnesol[2] treated |
| 3 | tripropylene glycol | 5.3 | 2 hrs 42 mins | | 3 hrs 3 mins | Magnesol[2] treated + $H_3PO_4$ (300 ppm) |
| 4 | tripropylene glycol | 5.3 | 2 hrs 42 mins | 2 hrs 44 mins | 2 hrs 49 mins | Magnesol[2] treated + $H_2SO_4$ (300 ppm) |
| 5 | tripropylene glycol | 7.94 | 2 hrs 38 mins | 170 mins (200° C.) | 2 hrs 52 mins | Magnesol[2] treated + $H_3PO_4$ (300 ppm) |
| 6 | tripropylene glycol | 5.3 | 2 hrs 28 mins | | 2 hrs 47 mins | distilled + $H_3PO_4$ (300 ppm) |

TABLE 3-continued

Conventional Polyol Initiators

| | STARTER | MOLS PO/MOLS STARTER | TIME TO INITIAL EXOTHERM | TIME TO PEAK EXOTHERM[1] | TIME TO PO COMPLETION | COMMENTS |
|---|---|---|---|---|---|---|
| 7 | tripropylene glycol | 5.3 | 2 hrs 26 mins | | 2 hrs 45 mins | distillation residue + $H_3PO_4$ (300 ppm) |
| 8 | tripropylene glycol | 5.3 | 1 hr 50 mins | 117 mins (209° C.) | 1 hr 59 mins | distillation residue |
| 9 | tripropylene glycol | 5.3 | 1 hr 6 mins | 71 mins (247° C.) | 1 hr 14 mins | distillation residue + stripped[3] |
| 10 | dipropylene glycol | 3.7 | | | 6 hrs 45 mins | distillation residue + stripped[3] |
| 11 | dipropylene glycol | 6.3 | 7 hrs 2 mins | | 47 mins | distilled + vacuum stripped[3] |
| 12 | dipropylene glycol | 7.02 | 2 hrs 54 mins | 182 mins (257° C.) | 11 mins | distilled + vacuum stripped[3], PO over sieves |
| 13 | dipropylene glycol | 5.82 | 3 hrs 11 mins | 216 mins (155° C.) | 15 mins | distilled + vacuum stripped[3], PO over sieves |
| 14 | trimethylol propane | 6.98 | | | | did not initiate in 10 hr |
| 15 | trimethylol propane | 7.45 | | | | $H_3PO_4$, did not initiate after 8 hr |
| 16 | trimethylol propane | 7.6 | | | | Vacuum stripped[3] did not initiate 5+ hr |

[1]The exotherm was controlled unless otherwise specified.
[2]Magnesol is the trade name for magnesium silicate which is typically used to remove catalyst residues from polyols. Here 5 gm of Magnesol was mixed with 1000 gm TPG, and the mixture stirred for 1 hour at 70° C. and then filtered.
[3]The starter was heated to 70° C. at less than 1 mm pressure for at least 2 hour.

EXAMPLE 4

Effect of PO/Starter Ratio and Impurities on PO Initiation Rate

An identical procedure to Example 2 was followed for these experiments. The results are included in Table 4.

TABLE 4

Effect of PO/Starter Ratio and Impurities on PO Initiation Rate

| | Starter | Moles PO/ Moles Starter | Time to Initial Exotherm | Time to Peak Exotherm | Time to PO Completion | Comments |
|---|---|---|---|---|---|---|
| 1 | neopentyl glycol | 2.87 | | | Did not initiate 7 hrs | >5 hrs 8 mins |
| 2 | neopentyl glycol | 4.77 | 6 hrs 10 mins | | | |
| 3 | neopentyl glycol | 4.77 | 5 hrs 59 mins | | 6 hrs 47 mins | 800 ppm $H_3PO_4$ |
| 4 | 1,4-butanediol | 4.12 | | | | did not initiate in 7 hr |
| 5 | 1,5-pentanediol | 8.3 | 4 hrs | 4 hrs 2 min (280° C.) | 4 hrs 15 min | |
| 6 | 1,6-hexanediol | 1.4 | | | | did not initiate |
| 7 | 1,6-hexanediol | 2.44 | 3 hrs | | 3 hrs 8 mins | |
| 8 | 1,6-hexanediol | 2.85 | 2 hrs 27 mins | | 2 hrs 44 mins | |
| 9 | 1,6-hexanediol | 3.26 | 1 hr 38 mins | | 1 hr 52 mins | |
| 10 | 1,6-hexanediol | 3.66 | 1 hr 31 mins | | 1 hr 45 mins | |
| 11 | CHDM | 2.48 | 1 hr 16 mins | 80 mins (156° C.) | 1 hr 24 mins | rxn at 125° C. |
| 12 | CHDM | 2.48 | 54 mins | 58 mins (169° C.) | 1 hr 4 mins | 800 ppm $H_3PO_4$ |
| 13 | CHDM | 3.13 | 1 hr 12 mins | 73 mins (230° C.) | 1 hr 15 mins | rxn at 125° C. |
| 14 | trans-CHDM | 2.48 | 3 hrs 48 mins | | 4 hrs 22 mins | rxn at 125° C. |

TABLE 4-continued

Effect of PO/Starter Ratio and Impurities on PO Initiation Rate

| | Starter | Moles PO/ Moles Starter | Time to Initial Exotherm | Time to Peak Exotherm | Time to PO Completion | Comments |
|---|---|---|---|---|---|---|
| 15 | trans-CHDM | 2.48 | 2 hrs 7 mins | | 2 hrs 25 mins | 800 ppm $H_3PO_4$ |
| 16 | HPR | 5.0 | 2 hrs 30 mins | 2 hrs 40 mins (210°) | 2 hrs 47 mins | 1400 ppm $H_3PO_4$ |

EXAMPLE 5

Effect of Impurities on PO Starter Initiation

An identical procedure to example 2 was followed for these experiments. The results are included in Table 5.

TABLE 5

Effect of Impurities on PO Starter Initiation

| | Starter | Moles PO/ Moles Starter | Time to Initial Exotherm | Time to Peak Exotherm | Time to PO Completion | Comments |
|---|---|---|---|---|---|---|
| 1 | 2-butyl-2-ethyl-1,3-propanediol | 2.76 | 1 hr 9 mins | | 1 hr 55 mins | Kyowa Hakko |
| 2 | 2-butyl-2-ethyl-1,3-propanediol | 4.41 | 25 mins | | 55 mins | Kyowa 300 ppm $H_3PO_4$ |
| 3 | 2-butyl-2-ethyl-1,3-propanediol | 4.41 | 23 mins | | 47 mins | Kyowa Hakko |
| 4 | 2-butyl-2-ethyl-1,3-propanediol | 4.41 | 43 mins | | 1 hr 12 mins | Kyowa + 300 ppm hexanal |
| 5 | 2-butyl-2-ethyl-1,3-propanediol | 4.41 | 1 hr 34 mins | | 2 hrs 22 mins | Kyowa + 800 ppm water |
| 6 | 2-butyl-2-ethyl-1,3-propanediol | 4.41 | 3 hrs 10 mins | | 3 hrs 52 mins | Kyowa + 2500 ppm water |
| 7 | 2,4-diethyl-1,5-pentanediol | 2.76 | 55 mins | | 1 hr 19 mins | |
| 8 | 2,4-diethyl-1,5-pentanediol | 4.41 | 31 mins | 34 mins (290° C.) | 36 mins | |
| 9 | 2,4-diethyl-1,5-pentanediol | 4.41 | 32 mins | 33 mins | 37 mins | 800 ppm $H_3PO_4$ |
| 10 | 2,4-diethyl-1,5-pentanediol | 4.41 | 23 mins | 25 mins | 29 mins | distilled |
| 11 | 2,4-diethyl-1,5-pentanediol | 4.41 | 25 mins | 26 mins | 29 mins | distillation residue |
| 12 | 2,4-diethyl-1,5-pentanediol | 4.41 | >7 hrs 40 mins | | | magnesol treated |
| 13 | 2,4-diethyl-1,5-pentanediol | 4.41 | 26 mins | 28 mins | 31 mins | magnesol treated then distillate |

EXAMPLE 6

DMC Catalyst Comparison

Similarly, the procedure of Example 2 was followed here for a comparison of some of the different catalysts. All of the results are presented in Table 6.

TABLE 6

DMC Catalyst Comparison[1]

| Starter (S) | PO/S | T (init) | T (peak) | PO complete | Comments |
|---|---|---|---|---|---|
| n-butanol | 2.3 | 5 mins | 7 mins — 125 C. | 10 mins | Control catalyst[2] |
| n-butanol | 2.3 | | 1 mins 285 C. | 2 mins or catalyst dead | Shell catalyst[3] |
| n-butanol | 2.3 | | 1 mins 277 C. | 3 mins or catalyst dead | Shell catalyst with t-butanol |

TABLE 6-continued

DMC Catalyst Comparison[1]

| Starter (S) | PO/S | T (init) | T (peak) | PO complete | Comments |
|---|---|---|---|---|---|
| dipropylene glycol | 6.3 | 7 hrs | | 47 mins | Control catalyst distilled + vacuum stripped[4] |
| dipropylene glycol | 6.2 | 7 mins | 7 mins — 125 C. | 2 hrs | distilled + stripped in reactor with Shell catalyst |
| dipropylene glycol | 7.5 | 8 mins | 8 mins — 130 C. | 4.25 hrs reaction stopped | distilled + stripped, PO on sieves — Shell catalyst |
| dipropylene glycol | 2.11 | 7 mins | 15 mins — 130 C. | 2 hrs 25 mins | DPG distilled, Shell catalyst |
| 2-butyl-2-ethyl-1,3-propanediol | 4.41 | 23 mins | | 47 mins | Control catalyst |
| 2-butyl-2-ethyl-1,3-propanediol | 4.41 | 5 mins | 6 mins — 334 C. | catalyst dead | more active ARCO catalyst[5] |
| 2-butyl-2-ethyl-1,3-propanediol | 4.41 | | 2 mins — 273 C. | ~6 mins | Shell catalyst |
| 2-butyl-2-ethyl-1,3-propanediol | 4.41 | 1 mins | 2 mins — 252 C. | 9 mins | Shell catalyst modified with t-BuOH |
| 2-butyl-2-ethyl-1,3-propanediol | 4.41 | 1 mins | 6 mins — 138 C. | 18 mins | General Tire catalyst modified with t-BuOH[6] |
| CHDM | 2.48 | 54 mins | 58 mins (169 C.) | 1 hr 45 mins | Control catalyst |
| CHDM | 2.48 | 4 mins | 4 mins — 220 C. | 24 mins | Shell catalyst |
| CHDM | 0.72 | 7 mins | 9.25 mins — 139 C. | 23 mins | Shell catalyst |
| CHDM | 35 | 60 mins | 64 mins (210 C.) | 65 mins | Control catalyst at 50 ppm based on 6000 mol wt |
| trimethylol propane | 6.24 | | | did not initiate 4.25 hrs | Shell (50 ppm) TMP stripped, PO on sieves |
| trimethylol propane | 16.7 | 15 mins | 15 mins — 154 C. | 2 hrs (PO uptake stopped ~75% uptake) | Shell catalyst (120 ppm) |
| trimethylol propane | 16.2 | 14 mins | 31 mins — 148 C. | 1 hrs 52 mins | Shell catalyst (120 ppm) TMP vacuum stripped |
| trimethylol propane | 32 | | | did not initiate in 4 hrs | Shell catalyst (50 ppm) TMP vacuum stripped |
| trimethylol propane | 16.7 | 22 mins | 22 mins — 140 C. | 2 hr reaction not complete | Shell (100 ppm) TMP stripped, 2500 ppm $H_3PO_4$ |
| trimethylol propane | 92 | 15 mins | 20 mins — 122 C. | 35 mins | Shell (275 ppm) based on 8200 mol wt |

Notes:
[1]Catalyst level of 50 ppm (based on a final equivalent weight of 2000) was used except where noted otherwise.
[2]Control catalyst is the catalyst from U.S. Pat. No. 5,712,216, Example 8.
[3]The Shell catalyst is from U.S. Pat. No. 4,477,589
[4]The conditions utilized to vacuum strip starters were: 3 hours at 70 C. at ~1 mm
[5]The more active ARCO catalyst is from U.S. Pat. No. 5,470,813, example 1.
[6]The General Tire preparation is from U.S. Pat. No. 3,427,334.

EXAMPLE 7

Single Reactor Batch Process for TMP (See Table 6)

In the 300 ml Parr reactor was added 2 gm of trimethylol propane, 80 gm PO and 0.034 gm of DMC catalyst (Shell Type). The mixture was heated and by the time the temperature reached 114° C. the reaction had commenced. The exotherm peaked at 122°C. 15 minutes after the heating was started. All of the PO was consumed in another 35 minutes. An additional 35.5 gms of PO were added and the reaction proceeded to completion in about 3 hours. The polyol had a calculated hydroxyl number of 21. The build ratio was just under 60.

EXAMPLE 8

Single Reactor Batch Process for CHDM (See Table 6)

In the 300 ml Parr reactor was added 2 gm of trimethylol propane, 60 gm PO and 0.0088 gm of DMC catalyst (Control catalyst). The mixture was heated from room temperature to 125° C. The reaction commenced about 1 hour after the heating was started (about 20 minutes after reaching 125° C.). The exotherm peaked at 210° C. after another 15 minutes and all the initially charged PO was consumed in another 2 minutes. An additional 41.5 gms of PO were added and the reaction proceeded to completion in 15 minutes. The last PO was charged (74 gms) and was consumed in another 1 hour. The polyol had a measured hydroxyl number of 18.6. The build was just over 40.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for making a polyether polyol, said process comprising:
   (a) polymerizing an epoxide in the presence of a double metal cyanide (DMC) catalyst and a first starter wherein the epoxide and first starter are continuously added to the reactor during step (a) to produce a polyol intermediate; and
   (b) reacting the polyol intermediate with additional epoxy to produce a polyether polyol; wherein said first starter is selected from the group consisting of:
      (i) at least one compound having the formula (I):

$$HO-H_2C-[CH_2]_n-OH \quad (I)$$

wherein n is an integer from 5 to 20;
      (ii) cyclohexane dimethanol;
      (iii) at least one compound having the formula (II):

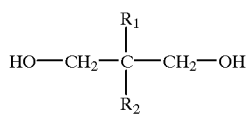

$$(II)$$

wherein $R_1$ and $R_2$ are individually selected from an alkyl group having 1 to 6 carbon atoms;
      (iv) at least one compound having the formulae (III) and (IIIA):

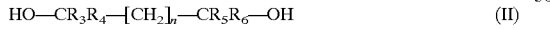
      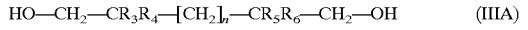

$$HO-CR_3R_4-[CH_2]_n-CR_5R_6-OH \quad (II)$$
      $$HO-CH_2-CR_3R_4-[CH_2]_n-CR_5R_6-CH_2-OH \quad (IIIA)$$

wherein $R_3$ and $R_5$ are individually selected from the group consisting of hydrogen and an alkyl group having 1 to 6 carbon atoms, $R_4$ and $R_6$ are individually selected from the group consisting of an alkyl group having 1 to 6 carbon atoms and n is an integer from 1 to 20;
      (v) bishydroxyethyl hydroquinone or bishydroxypropyl hydroquinone;
      (vi) bishydroxyethyl resorcinol or bishydroxypropyl resorcinol;
      (vii) α, α, α', α'-tetramethyl -1,3-benzene dimethanol or α, α, α', α'-tetramethyl-1,4-benzene dimethanol; and
      (viii) mixtures of compounds of groups (i) to (vii) or their ester or ether derivatives.

2. The process of claim 1 wherein said process is carried out in the absence of a solvent.

3. The process of claim 1 wherein a portion of the first starter is added to the reactor along with the double metal cyanide catalyst before the epoxide and the remainder of the first starter are continuously added to the reactor.

4. The process of claim 1 wherein a second starter is added during step (b), said second starter is also selected from the group consisting of compounds (i) to (viii).

5. The process of claim 1 wherein the epoxide is selected from the group consisting of ethylene oxide, propylene oxide, butylene oxides, and mixtures thereof.

6. The process of claim 1 wherein additional double metal cyanide catalyst is added to the reactor during step (b).

7. The process of claim 1 wherein the double metal cyanide catalyst is zinc hexacyanocobaltate.

8. The process of claim 1 wherein a second starter is added during step (b), said second starter selected from the group consisting of water, at least one low molecular weight polyol having at least one hydroxyl group and a number average molecular weight of less than 300 and mixtures of water and at least one of these low molecular weight polyols.

9. The process of claim 8 wherein the second starter is selected from the group consisting of water, glycerin, propylene glycol, dipropylene glycol, ethylene glycol, trimethylol propane, sucrose, sorbitol, tripropylene glycol and mixtures thereof.

10. A polyether polyol prepared by the process of claim 1.

11. A polyurethane prepared by reacting at least one polyether polyol of claim 10 with a polyisocyanate.

12. A process for making a polyether polyol, said process comprising:
    (a) polymerizing an epoxide in the presence of a double metal cyanide (DMC) catalyst and a first starter wherein the epoxide and first starter are continuously added to the reactor during step (a) to produce a polyol intermediate; and
    (b) reacting the polyol intermediate with additional epoxy to produce a polyether polyol;
    wherein step (a) is conducted with a mole ratio of total epoxide added to total first starter added of at least about 3:1; and wherein the total impurity level of water, propylene glycol and neutralized base residues in the added first starter is less than about 1000 parts per million by weight, and wherein the first starter is selected from the group consisting of:
       (i) at least one compound having the formula (I):

$$HO-H_2C-[CH_2]_n-OH \quad (I)$$

wherein n is an integer from 5 to 20;
       (ii) cyclohexane dimethanol;
       (iii) at least one compound having the formula (II):

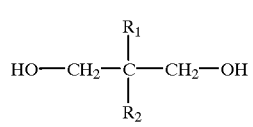

$$(II)$$

wherein $R_1$ and $R_2$ are individually selected from an alkyl group having 1 to 6 carbon atoms;
       (iv) at least one compound having the formulae (II) and (IIIA):

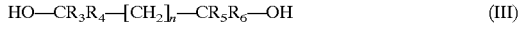
       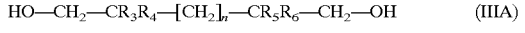

$$HO-CR_3R_4-[CH_2]_n-CR_5R_6-OH \quad (III)$$
       $$HO-CH_2-CR_3R_4-[CH_2]_n-CR_5R_6-CH_2-OH \quad (IIIA)$$

wherein $R_3$ and $R_5$ are individually selected from the group consisting of hydrogen and an alkyl group having 1 to 6 carbon atoms, $R_4$ and $R_6$ are individually selected from the group consisting of an alkyl group having 1 to 6 carbon atoms and n is an integer from 1 to 20;
       (v) bishydroxyethyl hydroquinone, or bishydroxypropyl hydroquinone;
       (vi) bishydroxyethyl resorcinol or bishydroxypropyl resorcinol;
       (vii) α, α, α', α'-tetramethyl-1,3-benzene dimethanol or α, α, α', α'-tetramethyl-1,4-benzene dimethanol;
       (viii) mixtures of compounds of groups (i) to (vii) or their ester or ether derivatives; and (ix) dipropylene glycol, tripropylene glycol and mixtures thereof.

13. The process of claim 12 wherein the mole ratio of total epoxide added to total first starter added is at least about 5:1.

14. The process of claim 12 wherein the level of the total amount of water, propylene glycol and neutralized base residues is less than about 500 parts per million by weight.

15. The process of claim 12 wherein said process is carried out in the absence of a solvent.

16. The process of claim 12 wherein a portion of the first starter is added to the reactor along with the double metal cyanide catalyst before the epoxide and the remainder of first starter are continuously added to the reactor.

17. The process of claim 12 wherein the first starter is selected from the group consisting of dipropylene glycol, tripropylene glycol and mixtures thereof.

18. The process of claim 12 wherein the epoxide is selected from the group consisting of ethylene oxide, propylene oxide, butylene oxides, and mixtures thereof.

19. The process of claim 12 wherein additional double metal cyanide catalyst is added to the reactor during step (b).

20. The process of claim 12 wherein the double metal cyanide catalyst is zinc hexacyanocobaltate.

21. A polyether polyol made by the process of claim 12.

22. A polyurethane prepared by reacting at least one polyether polyol of claim 21 with a polyisocyanate.

23. A two-stage batch process for making a polyether polyol in a reactor, said process comprising:
   (a) polymerizing an epoxide in the presence of a double metal cyanide catalyst and a starter to produce a polyol intermediate; and
   (b) adding additional epoxide and reacting the polyol intermediate with the additional epoxide in the reactor to produce a polyether polyol; wherein said starter is selected from the group consisting of:
   (i) at least one compound having the formula (I):

   $$HO—H_2C—[CH_2]_n—OH \qquad (I)$$

wherein n is an integer from 5 to 20;
   (ii) cyclohexane dimethanol;
   (iii) at least one compound having the formula (II):

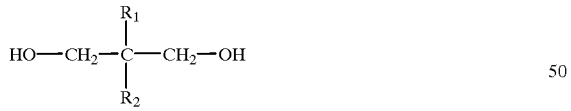
   $$HO—CH_2—\underset{\underset{R_2}{|}}{\overset{\overset{R_1}{|}}{C}}—CH_2—OH \qquad (II)$$

wherein $R_1$ and $R_2$ are individually selected from the group consisting of an alkyl group having 1 to 6 carbon atoms;
   (iv) at least one compound having the formulae (III) or (IIIA):

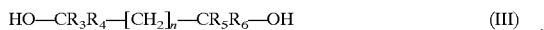
   $$HO—CR_3R_4—[CH_2]_n—CR_5R_6—OH \qquad (III)$$
   $$HO—CH_2—CR_3R_4—[CH_2]_n—CR_5R_6—CH_2—OH \qquad (IIIA)$$

wherein $R_3$ and $R_5$ are individually selected from the group consisting of hydrogen and an alkyl group having 1 to 6 carbon atoms, $R_4$ and $R_6$ are individually selected from the group consisting of an alkyl group having 1 to 6 carbon atoms and n is an integer from 1 to 20;
   (v) bishydroxyethyl hydroquinone, or bishydroxypropyl hydroquinone;
   (vi) bishydroxyethyl resorcinol or bishydroxypropyl resorcinol;
   (vii) α, α, α', α'-tetramethyl-1,3-benzene dimethanol or α, α, α', α'-tetranethyl-1,4-benzene dimethanol;
   (viii) dipropylene glycol or tripropylene glycol, wherein the impurity level of total amounts of water, propylene glycol and neutralized base residues is less than 1000 parts per million by weight and the mole ratio of total epoxide added to total starter added is at least about 3:1; and
   (ix) mixtures of compounds of groups (i) to (viii) or their ester or ether derivatives.

24. A polyether polyol made by the process of claim 23.

25. A polyurethane prepared by reacting at least one polyether polyol of claim 24 which a polyisocyanate.

26. A single batch process for making a polyether polyol, said batch process comprising:
   polymerizing an epoxide in the presence of a double metal cyanide catalyst and a starter; wherein the build ratio in the batch reactor is at least 20 and wherein the starter is selected from the group consisting of:
   (i) at least one compound having the formula (I):

   $$HO—H_2C—[CH_2]_n—OH \qquad (I)$$

wherein n is an integer from 5 to 20;
   (ii) cyclohexane dimethanol;
   (iii) at least one compound having the formula (II):

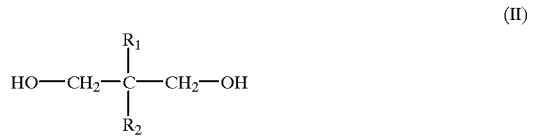
   $$HO—CH_2—\underset{\underset{R_2}{|}}{\overset{\overset{R_1}{|}}{C}}—CH_2—OH \qquad (II)$$

wherein $R_1$ and $R_2$ are individually selected from an alkyl group having 1 to 6 carbon atoms;
   (iv) at least one compound having the formulae (III) and (IIIA):

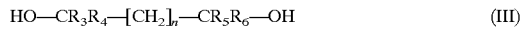
   $$HO—CR_3R_4—[CH_2]_n—CR_5R_6—OH \qquad (III)$$
   $$HO—CH_2—CR_3R_4—[CH_2]_n—CR_5R_6—CH_2—OH \qquad (IIIA)$$

wherein $R_3$ and $R_5$ are individually selected from the group consisting of hydrogen and an alkyl group having 1 to 6 carbon atoms, $R_4$ and $R_6$ are individually selected from the group consisting of an alkyl group having 1 to 6 carbon atoms and n is an integer from 1 to 20;
   (v) bishydroxyethyl hydroquinone or bishydroxypropyl hydroquinone;
   (vi) bishydroxyethyl resorcinol or bishydroxypropyl resorcinol;
   (vii) α, α, α', α'-tetramethyl-1,3-benzene dimethanol or α, α, α', α'-tetranethyl-1,4-benzene dimethanol; and
   (viii) mixtures of compounds of groups (i) to (vii) or their ester or ether derivatives.

27. A polyether polyol made by the process of claim 26.

28. A polyurethane made by reacting at least one polyether polyol of claim 27 with a polyisocyanate.

* * * * *